United States Patent [19]
Ryu

[11] Patent Number: 5,900,026
[45] Date of Patent: May 4, 1999

[54] METHOD AND APPARATUS FOR SETTING A COMPUTER COUPLED TO A NETWORK INTO A POWER SAVING MODE

[75] Inventor: Chang-Hyun Ryu, Kyungki-do, Rep. of Korea

[73] Assignee: SamSung Electronics Co., Ltd., Suwon, Rep. of Korea

[21] Appl. No.: 08/861,324

[22] Filed: May 21, 1997

[30] Foreign Application Priority Data

May 21, 1996 [KP] DPR of Korea ...................... 96-17222

[51] Int. Cl.⁶ ...................................................... G06F 1/32
[52] U.S. Cl. ...................................... 713/320; 395/750.05
[58] Field of Search ........................ 395/750.03, 750.05, 395/750.06, 750.04, 733; 364/707

[56] References Cited

U.S. PATENT DOCUMENTS

| | | | |
|---|---|---|---|
| 4,665,536 | 5/1987 | Kim | 364/707 |
| 5,167,024 | 11/1992 | Smith et al. | 395/750.04 |
| 5,339,437 | 8/1994 | Yuen | 395/734 |
| 5,355,501 | 10/1994 | Gross et al. | 395/750.05 |
| 5,432,946 | 7/1995 | Allard et al. | 395/750.05 |
| 5,475,847 | 12/1995 | Ikeda | 395/750.04 |
| 5,486,726 | 1/1996 | Kim et al. | 307/120 |
| 5,511,203 | 4/1996 | Wisor et al. | 395/750.04 |
| 5,548,763 | 8/1996 | Combs et al. | 395/750.05 |
| 5,560,021 | 9/1996 | Vook et al. | 395/750.05 |
| 5,579,252 | 11/1996 | Huang | 364/707 |
| 5,585,677 | 12/1996 | Cheon et al. | 307/64 |
| 5,586,333 | 12/1996 | Choi et al. | 395/750.03 |
| 5,590,342 | 12/1996 | Marisetty | 395/750.06 |
| 5,617,572 | 4/1997 | Pearce et al. | 395/750.05 |
| 5,633,573 | 5/1997 | Phuoc et al. | 320/128 |
| 5,655,127 | 8/1997 | Rabe et al. | 395/750.04 |
| 5,708,820 | 1/1998 | Park et al. | 395/750.05 |
| 5,721,935 | 2/1998 | DeSchepper et al. | 395/750.05 |
| 5,742,833 | 4/1998 | Dea et al. | 395/750.05 |
| 5,754,883 | 5/1998 | Lim et al. | 395/838 |

*Primary Examiner*—Gopal C. Ray
*Attorney, Agent, or Firm*—Robert E. Bushnell, Esq.

[57] ABSTRACT

A method and apparatus for setting a networked computer with a power saving on into a power saving mode in which power is selectively supplied to only those resources of the computer used in processing network interrupts. The method includes: the first step of supplying power and determining from a user the time operated with a power saving mode, and the computer is set to a first power saving mode if the access of input/output address of the resource does not occur for a predetermined time on a normal operation of the computer; the second step that the computer is set to a second power saving mode for processing an IRQ signal when the IRQ signal is generated in a state of the first power saving mode; the third step that the computer is set to a suspend mode if the access of input/output address of the resource and the IRQ signal is not detected for a predetermined time in a state of the first power saving mode, and is changed to a first power saving mode or a second power saving mode for processing an IRQ signal when the IRQ signal is generated; and the fourth step that the computer is set to a normal operation state if the access of input/output address of the resource occurs in a state of the first power saving mode or a second power saving mode. The present invention relates to the method having a power saving function which supplies power only to a basic device used in a network.

31 Claims, 7 Drawing Sheets

METHOD AND APPARATUS FOR SETTING A COMPUTER COUPLED TO A NETWORK INTO A POWER SAVING MODE

This application makes reference to, incorporates the same herein, and claims all benefits accruing under 35 U.S.C. §119 from an application for METHOD FOR SETTING A COMPUTER HAVING A POWER SAVING FUNCTION INTO A POWER SAVING MODE WHEN USING A NETWORK earlier filed in the Korean Industrial Property Office on the $21^{st}$ day of May 1996 and there duly assigned Ser. No. 96-17222, a copy of which application is annexed hereto.

BACKGROUND OF THE INVENTION

1. Field of the Invention

The present invention relates to a method and apparatus for reducing power consumption in a computer coupled to a network, and more particularly, to a method and apparatus for setting a computer with a power saving function into a power saving mode in which the computer supplies power to those devices that are used in communicating over the network and supplies no power to those devices not used network communications.

2. Description of the Prior Art

Advanced technological developments in computers have necessitated power saving functions, such as hibernation systems and related systems, in order to manage efficiently the supply of power to the various components in computers. A hibernation system may have either of two functions:

An emergency automatic restoration function for storing the present operating state in an auxiliary memory, such as a hard disk, when power to the computer is cut off by a sudden interruption in electric service or by an error on the part of a user. The hibernation system provides for restoring the operating state of the computer to the previous state, according to the contents of the auxiliary memory, when power to the computer is restored.

A power saving function for automatically storing the present operating state in the auxiliary memory and cutting off the power when the computer is idle for a predetermined length of time. The system resumes supplying power and returns the computer to its previous operating state when use of the computer is resumed.

In recent years demand in the personal computer market has expanded for a hibernation system having both an emergency automatic restoration function and a power saving function. Now various kinds of computers and software are also being supplied for various specialized applications. On the other hand, the volume of computation required for a computer to run a specific application has increased because of the requirements of advanced software and the capabilities of advanced hardware. This increase in computational requirements has brought about innovations such as multimedia computers. To compensate for the increased power consumption of multimedia computers, a power saving function is a very important feature of power management for such advanced hardware and software.

A computer having a power saving function has the following general structure. The basic components needed to operate the computer are the central processing unit (CPU), a memory, and a power supply. The computer can also have one or more resources, which can include, for example, an input device such as a keyboard or a mouse for receiving data to be processed by the CPU; an output device such as a monitor for displaying processed data or a printer for printing data; or an input/output device such as a hard disk drive for inputting data to and outputting A data from the CPU. Another resource the computer can have is a network device coupling the computer to a network and allowing the computer to communicate over the network. Various combinations of these and other resources are helpful or necessary for the computer to be used in many applications.

Among these devices and the other constituent elements of the computer, some are required to operate for operation of the computer, while the operation of others is not necessary to operation of the computer. A computer having a power saving function can include a power managing unit that controls the supply of power according to the needs of a user or predetermined criteria. The power managing unit provides for efficient use of power by reducing the use of power by elements of the computer whose operation is not necessary to the user's current activity or when conditions indicate that the computer is presently idle.

A power saving function generally operates in such a computer as follows. When power of the computer is turned on, the CPU and the memory operate. The computer receives from user input a time delay setting that determines how long the computer should operate in an idle state (e.g., without input from the user) before entering into a suspend mode; that is, the time delay setting determines the length of a time delay. The CPU determines whether such an input occurs before the time delay lapses. If an input from an input device occurs before the time delay lapses, then the computer continues to operate in a normal mode. While no input has occurred since the beginning of the time delay, CPU monitors whether the time delay has lapsed. As long as the time delay has not lapsed, the computer continues to operate in its normal mode (i.e., at fill power demand). As soon as the CPU determines that the time delay has lapsed without the occurrence of an input, though, it transmits a mode switching signal to the power managing unit.

The power managing unit regulates the power delivered by the power supply to the various constituent devices of the computer. When the power managing unit receives a mode switching signal and the computer is operating in its normal mode, it responds by setting the computer into the suspend mode and thereby reducing the computer's power consumption.

This approach has provided a certain degree of success in reducing unnecessary power consumption in a computer, but I have found that it contains a basic drawback. Even if a user does not enter an input directly, such as through an input device, during the predetermined time delay the computer's memory or another resource, such as an attached storage device, occasionally can be accessed during the time delay if the computer is coupled to a network. In such a case, the computer should not be set into the suspend mode merely because no direct user input has occurred.

SUMMARY OF THE INVENTION

Accordingly, It is an object of the present invention to provide a method and apparatus for setting a computer that is attached to a network and has a power saving function into a suspend mode that includes supplying no power to resources not used in network communication.

It is a further object of the present invention to provide a method and apparatus for conserving power in a computer attached to a network that adapt their power-saving response to whether a resource of the computer has been utilized remotely, as through network access.

To achieve these objects, a first aspect of the present invention provides a method for reducing power consumption in a computer that is coupled to a network and has a power saving function and one or more resources. The method can include the steps of supplying power to the computer and storing first, second, and third physical quantities, where the physical quantities represent time delay settings used in different phases of the method. It can also include the step of generating first and second measurements. The first measurement corresponds to a first time period during which the computer operates in a normal mode and during which none of one or more input/output addresses is accessed, where each address is associated with one of the resources. The second measurement corresponds to a second time period during which none of the input/output addresses is accessed and the computer operates in either a first power saving mode or a second power saving mode, or both at different times, without being set into the normal mode and without receiving an interrupt signal corresponding to the network.

The method includes a step of comparing the first measurement to the first physical quantity and setting the computer into the first power saving mode when the first measurement exceeds the first physical quantity. It also includes the step of comparing the second measurement to the second physical quantity and setting the computer into a suspend mode when the second measurement exceeds the second physical quantity. It further includes the step of setting the computer into the second power saving mode when the computer receives the network interrupt signal while operating in the first power saving mode. The second power saving mode includes the features of supplying power to any first device required to operate for the computer to send or receive communications over the network and of supplying no power to any second device not required to operate for the computer to send or receive such communications.

The method can also include the step of generating a third measurement corresponding to a third time period during which none of the input/output addresses are accessed an the computer operates continuously in the second power saving mode without receiving the network interrupt signal. It includes another step of comparing the third measurement to the third physical quantity and setting the computer into the first power saving mode when the third measurement exceeds the third physical quantity. It includes the further step of setting the computer into the normal mode when any of the input/output addresses is accessed while the computer is operating in the first power saving mode or the second power saving mode.

This aspect of the invention includes, in one embodiment, the case where one of the resources is a mass storage device. It also includes the case where another of the resources is either a keyboard, a mouse, or a printer.

In a second aspect of the present invention, a method is provided similar to the method of the first aspect of the invention, but in which the second measurement corresponds to a second time period during which none of the input/output addresses is accessed and the computer operates continuously in the first power saving mode without receiving the network interrupt signal.

In a third aspect of the present invention, a method is provided similar to the method of the first aspect, but including several different steps. Instead of the step involving comparing the second measurement and physical quantity and setting into the suspend mode, this method includes the step only of comparing the second measurement to the second quantity. Also, in place of the step of comparing the third measurement and physical quantity and setting into the first power saving mode, this method substitutes different steps. These different steps include detecting whether the computer is operating in the second power saving mode; setting the computer into the suspend mode when the second measurement exceeds the second physical quantity and the computer is not operating in the second power saving mode; and setting the computer into the first power saving mode when the second measurement exceeds the second physical quantity and the computer is operating in the second power saving mode. This method can also include the steps of supplying power to the computer, storing the first and second physical quantities, and generating the first and second measurements. It can also include the cases where one of the resources is a mass storage device; or where another of the resources is a keyboard, a mouse, or a printer.

In a further aspect of the invention, an apparatus is provided for reducing power consumption in a computer coupled to a network and having one or more resources. The apparatus includes first and second timing means, a comparator, a mode detector, and a mode switcher. The first timing means generates the first measurement as described above, and the second timing means generates the second measurement. The comparator compares the first and second measurements to the first and second physical quantities, respectively, and generates first and second comparison signals in accordance with the results of the comparisons. The mode detector detects the current mode of the computer and generates a current mode signal in accordance with the detected mode. The mode switcher responds to the current mode signal, the first and second comparison signals, the network interrupt signal, and any of one or more address signals, where each address signal indicates whether a corresponding one of the input/output addresses has been accessed. In response to these signals, the mode switcher generates a mode switching signal and communicates it to the power management unit.

The mode switching signal controls the power management unit to set the computer into various modes according to the conditions under which the mode switcher generated the mode switching signal. Under the control of the mode switching signal, the power management unit sets the computer into the first power saving mode when the first comparison signal indicates that the first measurement exceeds the first physical quantity; into the suspend mode when the second comparison signal indicates that the second measurement exceeds the second physical quantity and the current mode signal indicates that the current mode is not the second power saving mode; into the first power saving mode when the second comparison signal indicates that the second measurement exceeds the second physical quantity and the current mode signal indicates that the current mode is the second power saving mode; into the second power saving mode when the computer receives the network interrupt signal and the current mode signal indicates that the current mode is the first power saving mode; and into the normal mode when any of the address signals indicate that a corresponding one of the input/output addresses has been accessed and the current mode signal indicates that the current mode is either of the first and second power saving modes. In this apparatus, as in the previous aspects of the present invention, the second power saving mode is adapted to include supplying power to any first device that is required to operate for the computer to send or receive communications over the network and supplying no power to any second device not required to operate for the computer to send or receive such communications. In an optional embodiment, the apparatus includes the power management unit.

In another embodiment it includes a storage device for storing the first and second physical quantities, and the storage device may be a hard disk drive or a memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
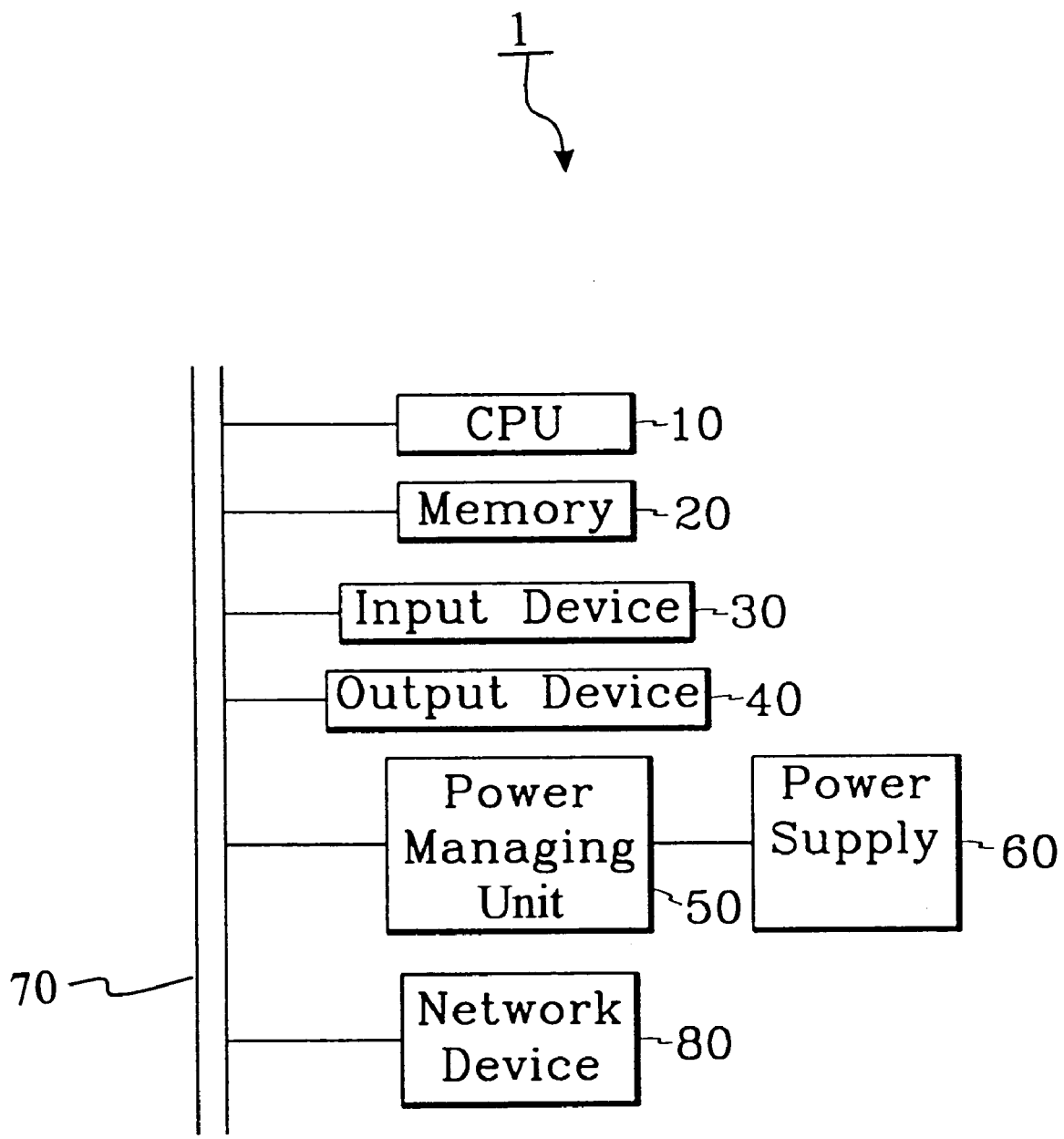
FIG. 1 is a block diagram of a computer having a generic power saving function.

A computer having a generic power saving function will now be explained with reference to the accompanying drawing figures. FIG. 1 is a block diagram of a computer having a generic power saving function. As shown in FIG. 1, a computer 1 with a power saving function includes a central processing unit (CPU) 10 that processes data according to instructions of a program. A memory 20 stores programs for initialization and POST, a BIOS (basic input output system) program for the hardware and software, and loaded system software and user software. An input device 30, such as a keyboard or a mouse, receives data to be processed by CPU 10. An output device 40, such as a monitor or printer, displays data processed by the CPU 10. A network device 80 connects to an external networking apparatus (not shown) to provide communication over a network. Power supply 60 supplies power for operation of all components of computer 1. A power managing unit 50 controls power supply 60. A bus 70 interconnects the various digital components.

Figure 2:
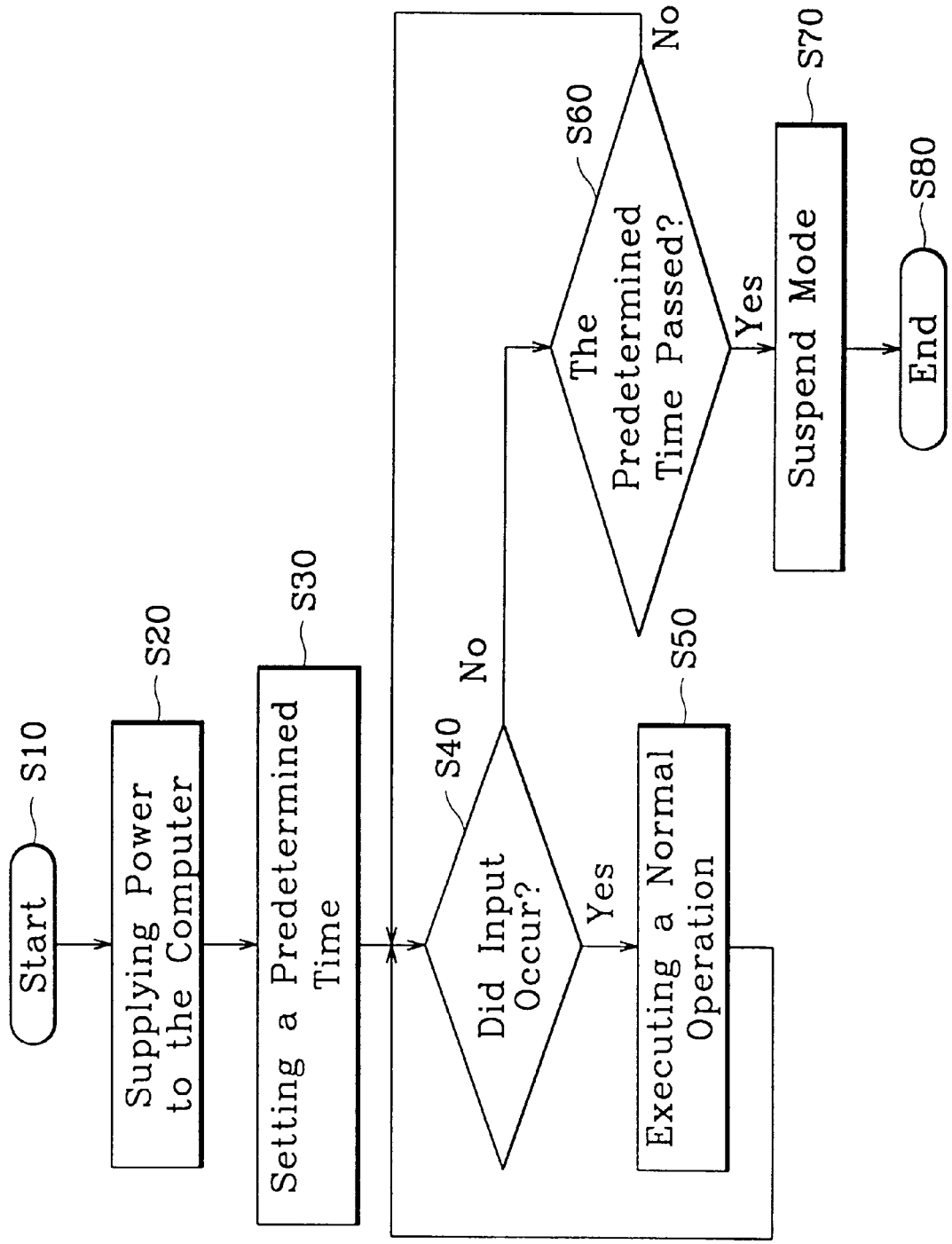
FIG. 2 is a flow chart showing the operation of a conventional computer having a power saving function.

FIG. 2 provides a flow chart showing the typical operation of a computer having a power saving function. As shown in FIG. 2, the operation of such a computer includes a starting step S10 and a power supplying step S20 which start operation of the computer. At step S30 the input of a time into a suspend mode. Step S40 determines whether a user input, such as from a keyboard, has occurred recently. Step S50 provides for normal operation if such an input is detected in step S40. Step S60 determines whether the preset time delay has lapsed without a user input. Step S70 provides for operation in a suspend mode if the determination of step S60 is affirmative. Step S80 ends the process.

Figure 3:
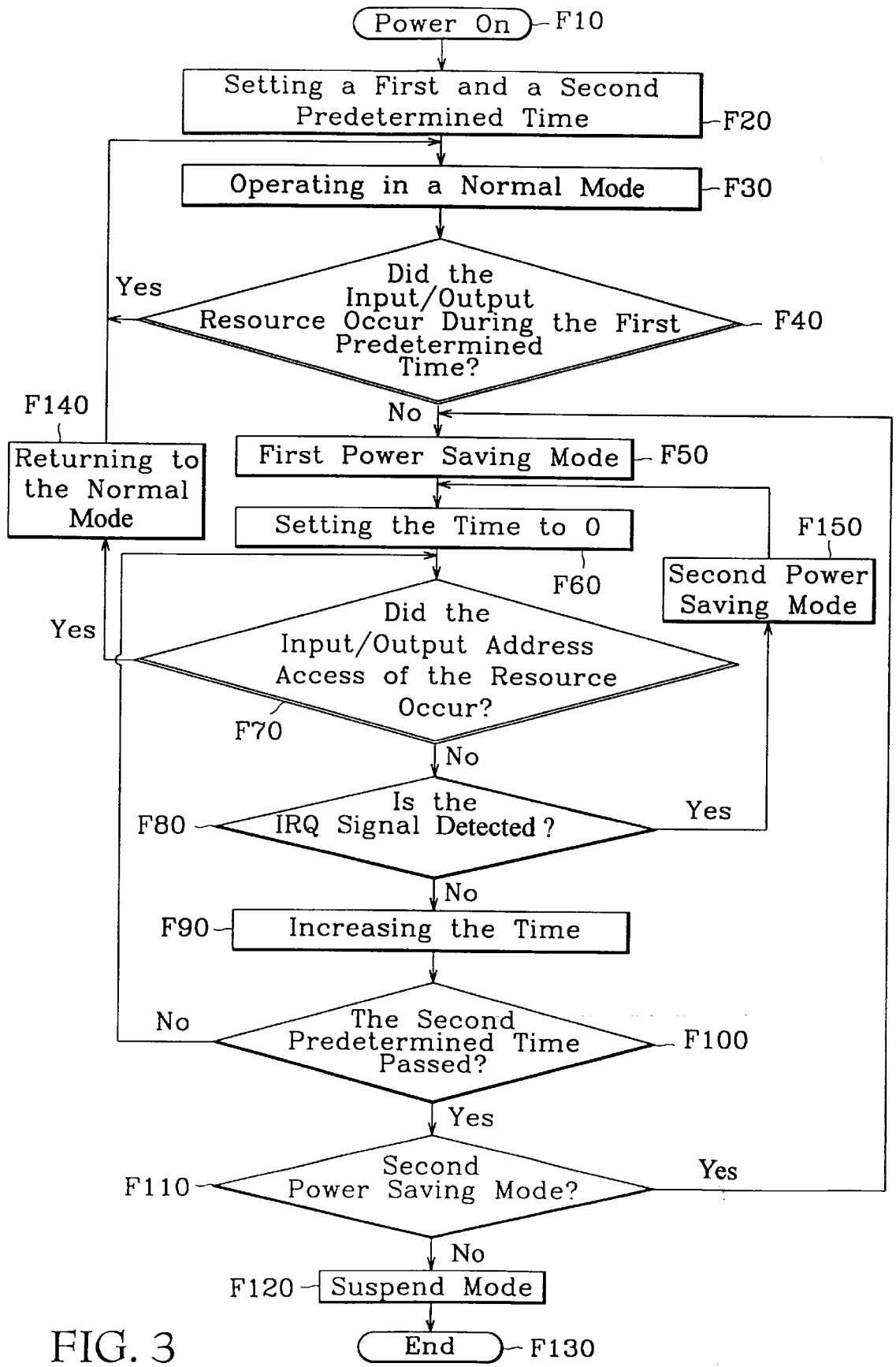
FIG. 3 is a flow chart showing the operation of the computer having a power saving function in accordance with a preferred embodiment of the present invention.

Various embodiments of the present invention will become apparent from a study of the following description with reference to FIGS. 3, 4A and 4B, 5, and 6. As shown in FIG. 3, a computer having a power saving function in accordance with one embodiment of the present invention includes the steps F10 of supplying power to the computer and F20 of setting first and second predetermined time delays. At step F30, after power has been supplied, the computer operates in a normal mode in which it is able to transmit and process signals. Step F40 determines whether an input/output address associated with any of the computer's resources has been accessed recently. The computer continues to operate in its normal mode if a recent input/output address access is detected at step F40.

On the other hand, the computer is set into a first power saving mode at step F50 if no input/output address access is detected before the first predetermined time delay has lapsed. This determination can include comparison of a value corresponding to the first predetermined time delay to a single time measurement. Alternatively, the determination can include comparison of the value to a first measurement designated specifically for time delays occurring in the normal mode. At step F60, after the computer is set into the first power saving mode, either the single time measurement is set to 0 or a second measurement, designated specifically for delays occurring in the first power saving mode, is initialized to 0. At step F70 the computer again determines whether any input/output address accesses have occurred recently. The computer is set into the normal mode again at step F140 if an input/output address access is detected at step F70. If no such access is detected, then at step F80 the computer determines whether a network interrupt (IRQ) signal has been received recently. Upon detection of such an IRQ signal, the computer is set into a second power saving mode at step F150.

If no IRQ signal is detected at step F80, then the procedure flows to step F90 where the appropriate time measurement (either the single time measurement, or the second measurement if the embodiment of the method utilizes a second measurement) is incremented. At step F100 the time measurement (either the single time measurement or the second measurement) is compared with a value corresponding to the second preset time delay to determine whether the second predetermined time delay has lapsed. If the step F100 determination is negative, the flow returns to step F70. If the second predetermined time delay has lapsed at step F100, then at step F110 the computer determines whether it is currently in the second power saving mode.

If the computer is in the second power saving mode when the determination of step F110 is made, the computer re-enters the first power saving mode at step F50. On the other hand, if the computer is not in the second power saving mode when the second preset time delay is found at step F100 to have lapsed, then the computer is set into a suspend mode at step F120. The procedure then terminates at step F130.

Figure 4A:
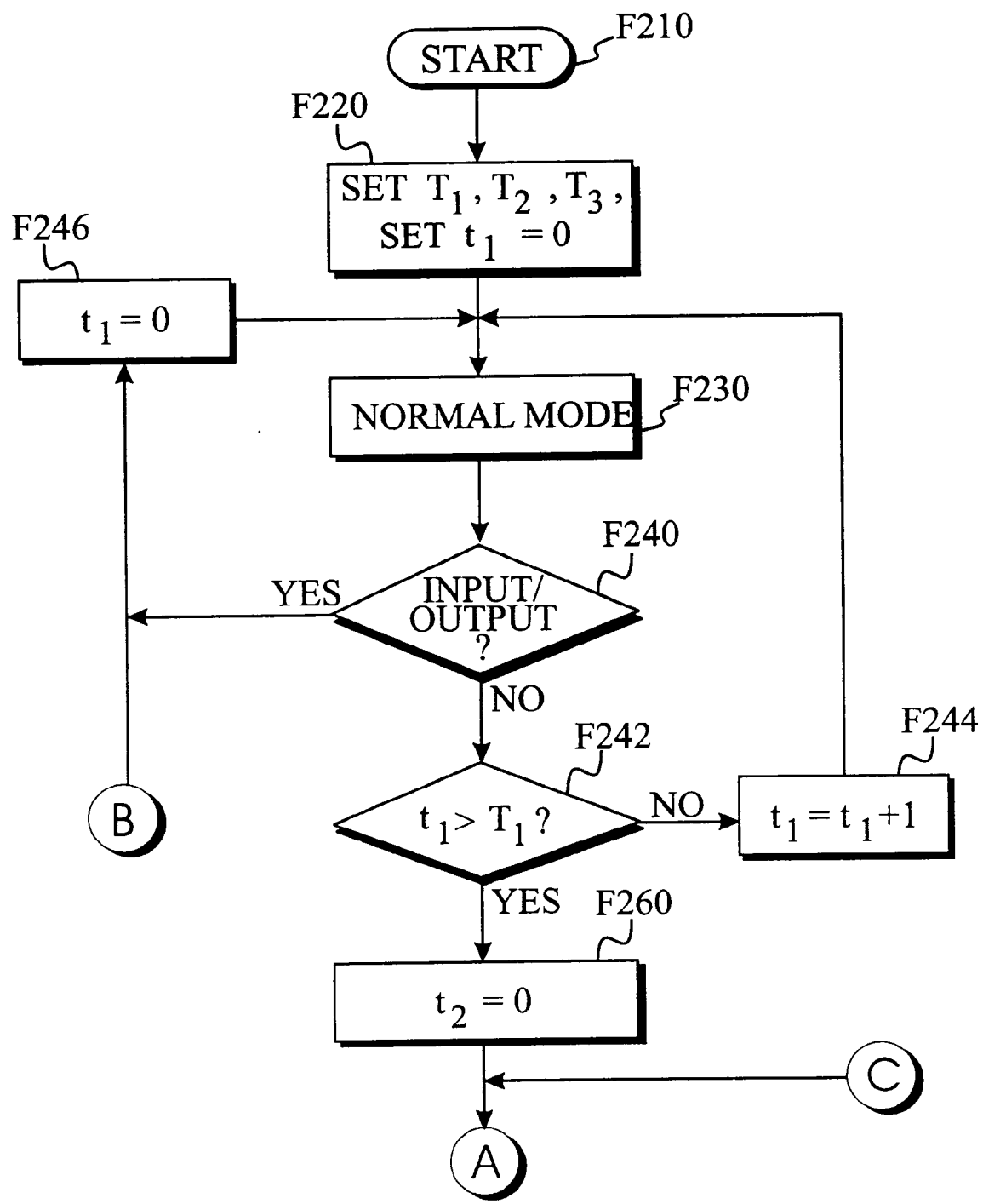
FIGS. 4A and 4B are connecting parts of a flow chart showing the operation of a computer having a power saving function according to an alternative embodiment of the present invention.
Figure 4B:
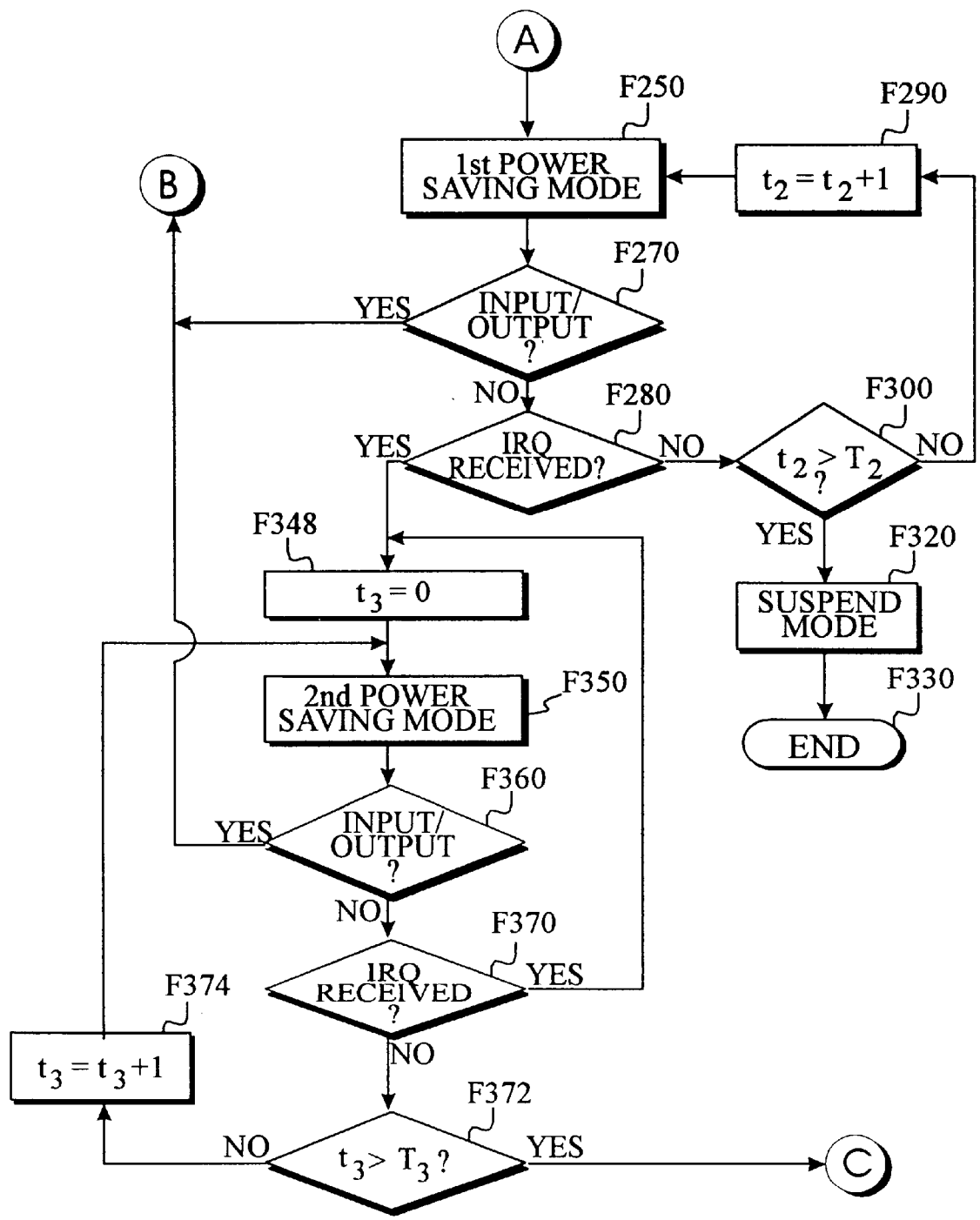

FIGS. 4A and 4B together show a flow diagram of a method according to an alternative embodiment of the present invention. At step F210 in FIG. 4A the method starts with supplying power to the computer. First, second, and third physical quantities, represented by T1, T2, and T3 in step F220, are then set and the first measurement is intialized by setting t1 to 0. The computer operates in the normal mode in step F230. At step F240 the CPU checks whether an input/output address was accessed. If one was accessed, the method proceeds to step F246, in which the first measurement is reinitialized. If no input/output access is detected at step F240, the CPU compares the first measurement, t1 to T1 at step F242. If t1≦T1 at step F244, then the method continues with operation in the normal mode; but if t1>T1, then the method initializes the second measurement, t2, to zero at step F260.

Following the flow through connector A to FIG. 4B, the method then sets the computer into the first power saving mode at step F250. At step F270 the CPU again checks whether any input output addresses have been accessed and, if so, sends the flow (through connector B) to step F246 where the first measurement is reinitialized. If no input/output access is detected at step F270, the method proceeds to step F280, where the CPU checks whether an IRQ (i.e., a network interrupt signal) was received. If no IRQ was received, then the CPU compares t2 to T2 at step F300. If t2 does not exceed T2 at F300, then the method proceeds to step F290, where the CPU increments second measure t2 and continues with the first power saving mode at step 250. If t2 exceeds T2 at F300, then the flow proceeds to step F320, where the computer is set into the suspend mode, and from F320 to F330, where the procedure ends. If a network IRQ is detected at step F280, then the flow proceeds to step 348 where the CPU initializes the third measurement, t3. The computer is then set into the second power saving mode at step F350.

At step F360, while in the second power saving mode, the CPU checks for input/output accesses. The method again proceeds (through connector B to FIG. 4A) to reinitialize t1 at F246 if an input/output access is detected at step F360. If no input/output accesses are detected at F360, at step F370 the CPU again checks for a network IRQ. If an IRQ is detected, the method reinitializes the third measurement, t3, at F348 and continues in the second power saving mode. If no IRQ is detected at F370, the CPU then compares t3 to T3 and continues in the second power saving mode through step F374, which increments t3, if t3≦T3. If t3 exceeds T3 at F372, then the flow returns to step F230 in FIG. 4A (through connector C) where the computer is set into the first power saving mode again.

In another variation on this embodiment, a single time measurement can be used instead of first, second, and third measurements indicated in FIGS. 4A and 4B by t1, t2, and t3, respectively. In yet another variation, only first and second measurements are used; in this case, the second measurement t2 is used for every occurrence of t2 and t3 in FIGS. 4A and 4B.

Figure 5:
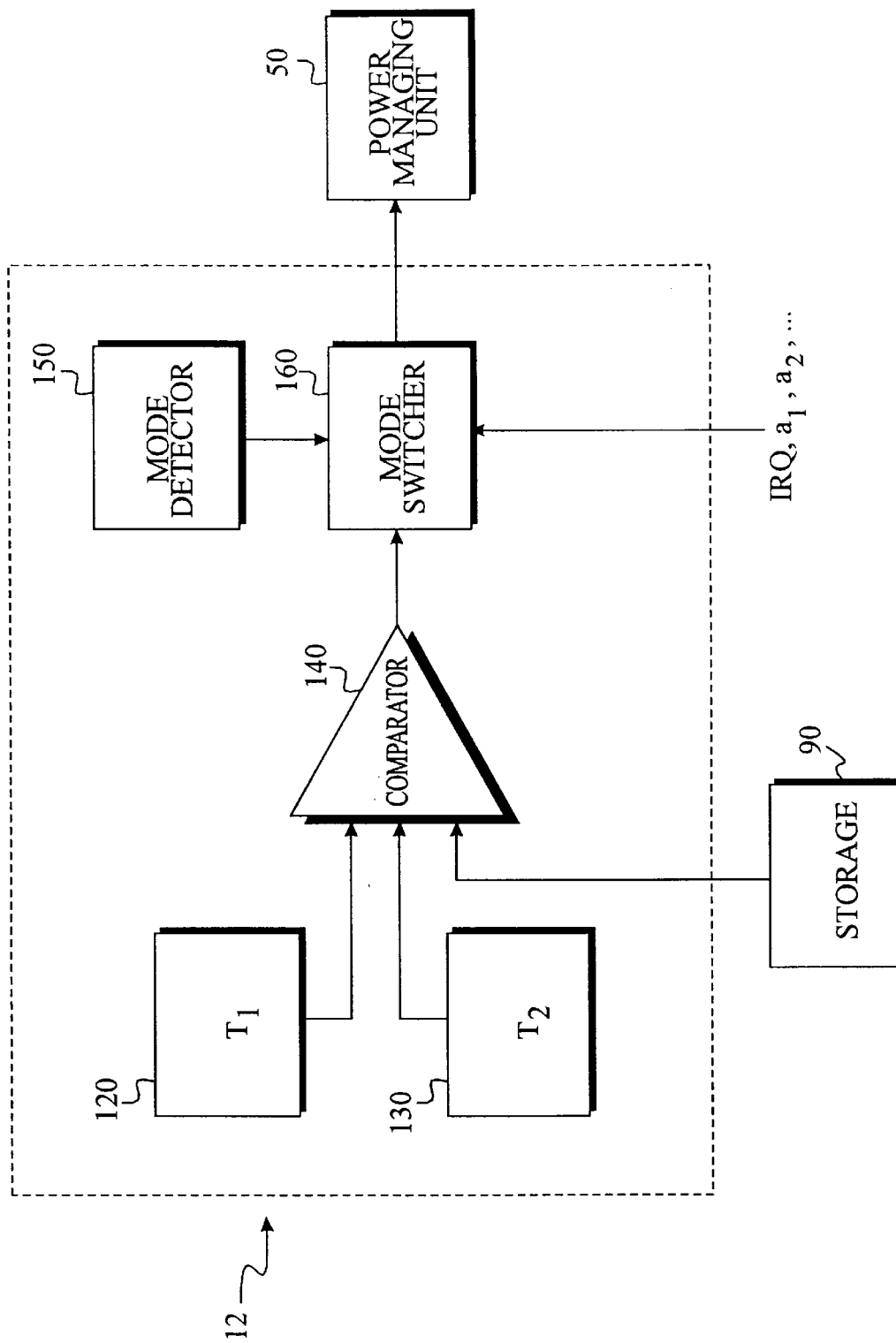
FIG. 5 is a block diagram of an apparatus in accordance with a preferred embodiment of the present invention.

FIG. 5 shows a block diagram of an apparatus embodying a further aspect of the present invention. The operation of apparatus 12 reduces power consumption in a computer (not shown), where the computer is coupled to a communications network (e.g., a LAN, WAN, intranet, Internet, etc.) and has one or more resources. These resources may include memory, keyboard, mouse, mass storage device, printer, etc. Apparatus 12 may be implemented in software according to methods well known in the digital computer arts.

Apparatus 12 includes first timing means 120 and second timing means 130, which generate first and second measurements, respectively. These measurements indicate the amount of time elapsed without the occurrence of a significant resource event while the computer operates in different modes, according to the method disclosed in FIG. 3 and the accompanying description. Alternatively, apparatus could include a third timing means (not shown) for generating a third measurement as disclosed in FIGS. 4A and 4B and the accompanying description. First and second timing means 120, 130 send their respective measurements to a comparator 140, which also receives first and second physical quantities from storage 90. Storage 90 can include a portion of memory 20, (FIG. 1) and alternatively it can include a resource such as a hard disk drive. In an optional embodiment, storage 90 is a memory included as a component of apparatus 12.

Comparator 140 compares the first and second measurements to the first and second physical quantities, respectively, and generates first and second comparison signals indicating the results of these respective comparisons. A mode detector 150 detects the computers current mode of operation (e.g., normal mode, first power saving mode, etc.) and generates a current mode signal indicating the current mode. A mode switcher 160 receives the first and second comparison signals from comparator 140, the current mode signal from the mode detector 150, and a network interrupt (IRQ) signal and one or more address signals a1, a2, etc., generated by other components (not shown) of the computer, each of the address signals indicates whether a corresponding one of the input/output addresses has been accessed. Mode switcher 160 generates a mode switching signal in accordance with the indications of the particular signals it receives.

Mode switcher 160 sends the mode switching signal to power managing unit 50, which responds by setting the computer into different modes in accordance with the signal. The response of power managing unit 50 follows an embodiment of the method of the present invention as disclosed in either FIG. 3 or FIGS. 4A and 4B.

Figure 6:
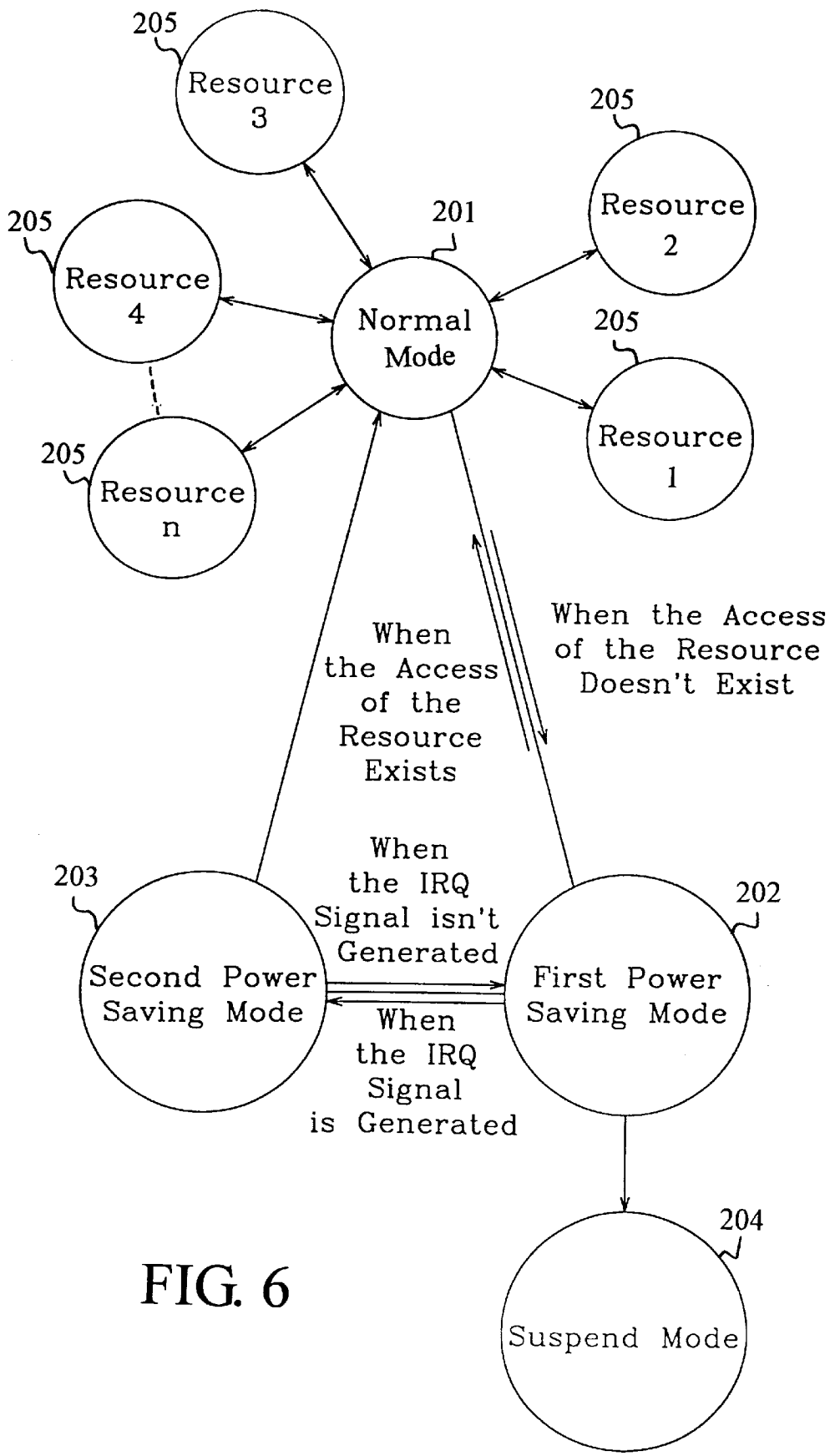
FIG. 6 is a state diagram showing the operation of the computer having a power saving function in accordance with the preferred embodiment of the present invention.

The operation of a power saving function operating in a networked computer according to the present invention will now be described with reference to FIGS. 1 and 6. Power supply 60 supplies power to all devices in computer 1 when computer 1 is started. A user may designate the times for changing from the normal mode 201 to the first power saving mode 202, from the first power saving mode 202 to the second power saving mode 203, and from the first power saving mode 202 to the suspend mode 204 by setting values for the first and second (or the first, second, and third) physical quantities. These physical quantities can be stored and then loaded automatically when computer 1 executes its self test during the booting process. The user operates the computer in the normal mode 201, for which power managing unit 50 directs a supply of power to all devices in computer 1. Computer 1 monitors activity involving accesses to input/output addresses corresponding to one or more resources 205 and determines whether the time that has passed since the most recent such access exceeds one or another of the preset time delays as represented by the physical quantities (with the particular time delay depending upon the current mode).

The computer operates in normal mode 201 even without an input/output activity, such as a keyboard input, until the preset time delay indicated by the first physical quantity has lapsed. Upon lapse of the preset time delay without input/output activity, CPU 10 (operating in part as mode switcher 160 in FIG. 5) transmits to power managing unit 50 a mode switching signal controlling power managing unit 50 to set computer 1 into the first power saving mode 202. Power managing unit 50 adjusts the power supplied to the various resources 205 in accordance with the power saving configuration indicated by first power saving mode 202. CPU 10 initializes the second measurement to 0 and continues to monitor the overall system for input/output address access as computer 1 proceeds with operation in first power saving mode 202. CPU also monitors for reception of an IRQ signal by computer 1 at network device 80. If computer 1 does not receive a network IRQ signal, the CPU (operating in part as the second timing means 130 in FIG. 5) increases the value of the second measurement, t2, and continues to monitor for input/output activity.

Upon receipt of an address signal indicating access to an input/output address, CPU 10 transmits to power managing unit 50 a mode switching signal that controls power managing unit 50 to set computer 1 again into normal mode 201. Power managing unit 50 again determines the supply of power to the devices of the computer in accordance with the configuration of normal mode 201. If the second preset time delay lapses with neither occurrence of an input/output access nor receipt of an IRQ signal, then CPU 10 generates a mode switching signal controlling the power managing unit to set computer 1 into suspend mode 204. CPU 10 transmits to the power management unit 50 a mode switching signal calling for entry into suspend mode 204 and then stores any data currently being processing. Power managing unit 50 then turns off the power supplied by power supply 60.

CPU 10 generates a power switching signal calling for entry into second power saving mode 203 if the IRQ signal is received while computer 1 is operating in first power saving mode 202. This power switching signal controls power managing means 50 to supply power to those specific components of computer 1 whose operation is required for processing an IRQ corresponding to network activity. Other resources, whose operation is not required for response to intermittent network IRQ signals, are not supplied with power in second power saving mode 203. Note that the specific configuration for distribution of power in second power saving mode 203 will depend on the hardware configuration of computer 1 and typically can be provided to power managing unit 50 as a predetermined instruction list. Optionally, this configuration may be programmable by a user through software switches to reflect changes in the hardware configuration, methods for the software implementation of which are well known in the digital computer and software arts.

Thus, during an idle episode characterized by intermittent IRQ signals from the network but no other activity, power managing unit 50 supplies power to CPU 10 and resources 205 selectively and with a low overall power consumption rate. Through the embodiments disclosed above, the present invention therefore provides a method and apparatus for reducing power consumption in a networked computer by adapting power distribution during such idle episodes to the requirements of the computer hardware for processing network interrupts.

What is claimed is:

1. A method for reducing power consumption in a computer coupled to a network and having a power saving function and at least one resource, comprising the steps of:

comparing a first measurement to a first physical quantity and setting said computer into a first power saving mode when said first measurement exceeds said first physical quantity, said first power saving mode for supplying power for monitoring input/output address access and interrupt signal reception wherein said first measurement corresponds to a first time period during which said computer operates continuously in a normal mode and during which no input/output address is accessed, with each said input/output address respectively associated with a corresponding said resource, said normal mode for supplying power to all devices in said computer;

comparing a second measurement to a second physical quantity and setting said computer into a suspend mode when said second measurement exceeds said second physical quantity, said suspend mode for turning off power to all devices in said computer wherein said second measurement corresponds to a second time period during which no said input/output address is accessed and during which said computer operates in one of said first power saving mode and a second power saving mode without being set into said normal mode and without receiving an interrupt signal corresponding to said network;

setting said computer into said second power saving mode when said computer receives said interrupt signal while operating in said first power saving mode, with said second power saving mode for supplying power to at least one device in said computer that is required to operate for said computer to at least one of send and receive communications over said network and for supplying no power to at least one other device in said computer that is not required to operate for said computer to at least one of send and receive communications over said network;

comparing a third measurement to a third physical quantity and setting said computer into said first power saving mode when said third measurement exceeds said third physical quantity, wherein said third measurement corresponds to a third time period during which no said input/output address is accessed and during which said computer operates continuously in said second power saving mode without receiving said interrupt signal; and setting said computer into said normal mode when any said input/output address is accessed while said computer is operating in one of said first power saving mode and said second power saving mode.

2. The method of claim 1, further comprising the steps of:

supplying power to said computer; and storing said first physical quantity, said second physical quantity, and said third physical quantity.

3. The method of claim 2, further comprising the step of generating said first measurement.

4. The method of claim 3, further comprising the step of generating said second measurement.

5. The method of claim 4, further comprising the step of generating said third measurement.

6. The method of claim 5, wherein said at least one resource comprises at least one of a mass storage device, a keyboard, a mouse, and a printer.

7. The method as claimed of claim 6, wherein said first physical quantity comprises a first time delay setting, said second physical quantity comprises a second time delay setting, and said third physical quantity comprises a third time delay setting.

8. The method of claim 1, wherein said at least one resource comprises at least one of a mass storage device, a keyboard, a mouse, and a printer.

9. The method of claim 1, wherein said first physical quantity comprises a first time delay setting, said second physical quantity comprises a second time delay setting, and said third physical quantity comprises a third time delay setting.

10. A method for reducing power consumption in a computer coupled to a network and having a power saving function and at least one resource, comprising the steps of:

comparing a first measurement with a first physical quantity and setting said computer into a first power saving mode when said first measurement exceeds said first physical quantity, said first power saving mode for supplying power for monitoring input/output address access and interrupt signal reception, wherein said first measurement corresponds to a first time period during which said computer operates continuously in a normal mode and no input/output address is accessed, with each said input/output address respectively associated with a corresponding said resource said normal mode for supplying power to all devices in said computer;

comparing a second measurement to a second physical quantity and setting said computer into a suspend mode when said second measurement exceeds said second physical quantity, said suspend mode for turning off power to all devices in said computer, wherein said second measurement corresponds to a second time period during which no said input/output address is accessed and during which said computer operates continuously in said first power saving mode without receiving an interrupt signal corresponding to said network;

setting said computer into a second power saving mode when said computer receives said interrupt signal while operating in said first power saving mode, with said second power saving mode for supplying power to at least one device in said computer that is required to operate for said computer to at least one of send and receive communications over said network and for supplying no power to at least one other device in said computer that is not required to operate for said computer to at least one of send and receive communications over said network;

comparing a third measurement with a third physical quantity and setting said computer into said first power saving mode when said third measurement exceeds said third physical quantity, wherein said third measurement corresponds to a third time period during which no said input/output address is accessed and during which said computer operates continuously in said second power saving mode without receiving said interrupt signal; and setting said computer into said normal mode when any said input/output address is accessed while said computer is operating in one of said first power saving mode and said second power saving mode.

11. The method of claim 10, further comprising the steps of:

supplying power to said computer; and storing said first physical quantity, said second physical quantity, and said third physical quantity.

12. The method of claim 11, further comprising the step of generating said first measurement.

13. The method of claim 12, further comprising the step of generating said second measurement.

14. The method of claim 13, further comprising the step of generating said third measurement.

15. The method of claim 11, wherein said at least one resource comprises at least one of a mass storage device, a keyboard, a mouse, and a printer.

16. The method of claim 15, wherein said first physical quantity comprises a first time delay time setting, said second physical quantity comprises a second time delay setting, and said third physical quantity comprises a third time delay setting.

17. The method as claimed of claim 10, wherein said first physical quantity comprises a first time delay setting, said second physical quantity comprises a second time delay setting, and said third physical quantity comprises a third time delay setting.

18. A method for reducing power consumption in a computer coupled to a network and having a power saving function and at least one resource, comprising the steps of:

comparing a first measurement with a first physical quantity and setting said computer into a first power saving mode when said first measurement exceeds said first physical quantity, said first power saving mode for supplying power for monitoring input/output address access and interrupt signal reception wherein said first measurement corresponds to a first time period during which said computer operates continuously in a normal mode and no input/output address is accessed, with each said input/output address respectively associated with a corresponding said resource said normal mode for supplying power to all devices in said computer;

setting said computer into a second power saving mode when said computer receives an interrupt signal while operating in said first power saving mode, with said second power saving mode for supplying power to at least one device in said computer that is required to operate for said computer to at least one of send and receive communications over said network and for supplying no power to at least one other device in said computer that is not required to operate for said computer to at least one of send and receive communications over said network;

comparing a second measurement to a second physical quantity, wherein said second measurement corresponds to a second time period during which no said input/output address is accessed and during which said computer operates in one of said first power saving mode and said second power saving mode without being set into said normal mode and without receiving said interrupt signal corresponding to said network;

detecting whether said computer is operating in said second power saving mode;

setting said computer into a suspend mode when said second measurement exceeds said second physical quantity and said computer is not operating in said second power saving mode said suspend mode for turning off power to all devices in said computer;

setting said computer into said first power saving mode when said second measurement exceeds said second physical quantity and said computer is operating in said second power saving mode; and setting said computer into said normal mode when any said input/output address is accessed while said computer is operating in one of said first power saving mode and said second power saving mode.

19. The method of claim 18, further comprising the steps of:

supplying power to said computer; and storing said first physical quantity and said second physical quantity.

20. The method of claim 19, further comprising the step of generating said first measurement.

21. The method of claim 20, further comprising the step of generating said second measurement.

22. The method of claim 21, wherein said at least one resource comprises at least one of a mass storage device, a keyboard, a mouse, and a printer.

23. The method of claim 22, wherein said first physical quantity comprises a first time delay setting and said second physical quantity comprises a second time delay setting.

24. The method of claim 18, wherein said first physical quantity comprises a first time delay setting and said second physical quantity comprises a second time delay setting.

25. An apparatus for reducing power consumption in a computer coupled to a network and having at least one resource, said apparatus comprising:

a first timing means for generating a first measurement corresponding to a first time period during which said computer operates continuously in a normal mode and no input/output address is accessed, with each said input/output address respectively associated with a corresponding said resource, said normal mode for supplying power to all devices in said computer;

a second timing means for generating a second measurement corresponding to a second time period during which no said input/output address is accessed and during which said computer operates in one of a first power saving mode and a second power saving mode without being set into said normal mode and without receiving an interrupt signal corresponding to said network, said first power saving mode for supplying power for monitoring input/output address access and interrupt signal reception;

a comparator for comparing said first measurement with a first physical quantity and generating a first comparison signal and for comparing said second measurement with a second physical quantity and generating a second comparison signal;

a mode detector for detecting a current mode of said computer and generating a current mode signal in accordance with said current mode and a mode switcher for generating a mode switching signal and communicating said mode switching signal to a power managing unit in response to said current mode signal, said first comparison signal, said second comparison signal, said interrupt signal, and any address signal, with each said address signal indicating whether a corresponding said input/output address has been accessed, wherein said mode switching signal controls said power managing unit to set said computer into said first power saving mode when said first comparison signal indicates that said first measurement exceeds said first physical quantity, said mode switching signal controls said power managing unit to set said computer into a suspend mode when said second comparison signal indicates that said second measurement exceeds said second physical quantity and said current mode signal indicates that said current mode is not said second power saving mode said suspend mode for turning off power to all devices in said computer, said mode switching signal controls said power managing unit to set said computer into said first power saving mode when said second comparison signal indicates that said second measurement exceeds said second physical quantity and said current mode signal indicates that said current mode is said second power saving mode, said mode switching signal controls said power managing unit to set said computer into said second power saving mode when said computer receives said interrupt signal and said current mode signal indicates that said current mode is said first power saving mode, with said second power saving mode for supplying power to at least one device in said computer that is required to operate for said computer to at least one of send and receive communications over said network and for supplying no power to at least one other device in said computer that is not required to operate for said computer to at least one of send and receive communications over said network, and said mode switching signal controls said power managing unit to set said computer into said normal mode when any said address signal indicates that a corresponding said input/output address has been accessed and said current mode signal indicates that said current mode is one of said first power saving mode and said second power saving mode.

26. The apparatus of claim 25, further comprising said power managing unit.

27. The apparatus of claim 26, further comprising a storage device for storing said first physical quantity and said second physical quantity.

28. The apparatus of claim 27, wherein said storage device comprises a hard disk drive.

29. The apparatus of claim 27, wherein said storage device comprises a memory.

30. The apparatus of claim 27, wherein said first physical quantity comprises a first time delay setting and said second physical quantity comprises a second time delay setting.

31. The apparatus of claim 25, wherein said first physical quantity comprises a first time delay setting and said second physical quantity comprises a second time delay setting.

* * * * *